United States Patent [19]

Wahlquist

[11] 4,054,482

[45] Oct. 18, 1977

[54] TAPE AND APRON DISPENSING APPARATUS

[76] Inventor: Stanley L. Wahlquist, 3203 S. Main St., Rockford, Ill. 61102

[21] Appl. No.: 757,649

[22] Filed: Jan. 7, 1977

[51] Int. Cl.$^2$ .......................... B32B 31/00; B31F 5/00

[52] U.S. Cl. .................................... 156/523; 156/554; 156/577

[58] Field of Search ............... 156/523, 527, 554, 577, 156/579

[56] References Cited

U.S. PATENT DOCUMENTS

| | | | |
|---|---|---|---|
| 3,152,032 | 10/1964 | Waltz | 156/554 |
| 3,463,694 | 8/1969 | Roshia | 156/523 |
| 3,950,214 | 4/1976 | Pool et al. | 156/527 |

*Primary Examiner*—Douglas J. Drummond
*Attorney, Agent, or Firm*—Morsbach & Pillote

[57] ABSTRACT

A tape and apron dispensing apparatus in which the apron roll and tape roll are mounted for rotation about spaced, relatively parallel axes at one side of an elongated body member and the portion of the body member intermediate the tape and apron rolls is shaped to provide a handgrip paralleling the path of withdrawal of the taped apron and adapted to be grasped in one hand to enable hand manipulation of the tape and apron dispensing apparatus when applying the taped apron to a surface to be masked. An apron roll brake and cut-off device is mounted on the dispenser to facilitate severing of an end section of the taped apron.

10 Claims, 4 Drawing Figures

TAPE AND APRON DISPENSING APPARATUS

BACKGROUND OF THE INVENTION

In masking large areas for painting and the like, it is common practice to utilize a large non-adhesive apron strip and to affix the same to a surface to be masked by a strip of pressure sensitive tape applied along an edge of the apron strip. Many of the apparatus for applying a strip of pressure sensitive tape to a masking apron are of the stationary type, that is are of the type where the apparatus is mounted at a fixed location so that a strip of taped apron must be withdrawn and severed from the rolls on the apron taping apparatus before the severed strip can be applied to the surface to be masked. Portable tape and apron dispensing apparatus have been proposed. However, a portable tape and apron dispensing apparatus must not only be capable of applying tape to the apron and dispensing the taped apron, but it must also be readily and easily manipulated to position and guide the taped apron during the masking operation.

In my U.S. Pat. No. 3,787,271, issued Jan. 22, 1974, there is disclosed a tape and apron dispensing apparatus which is adapted to be held in one hand to enable manipulation of the dispensing apparatus with one hand so that the user's other hand was free to apply a taped apron to the surface to be masked. However, some problems were encountered in tearing off the dispensed end portion of the taped apron.

SUMMARY OF THE INVENTION

The present invention relates to a tape and apron dispensing apparatus of the type wherein the apron roll and tape roll are mounted for rotation about spaced relatively parallel axes at one side of an elongated body member and the body member intermediate the tape and apron rolls is shaped to provide a hand grip paralleling the path of withdrawal of the taped apron and adapted to be grasped in one hand to enable hand manipulation of the tape and apron dispensing apparatus when applying the taped apron to a surface to be masked. It is the object of the present invention to provide a tape and apron dispensing apparatus of the type described and having a roll brake and cut-off device to facilitate tearing of an end section of the taped apron off the apron roll; in which the roll brake and cut-off mechanism can be operated by the same hand used to hold and manipulate the dispensing apparatus; and in which the roll brake and cut-off apparatus is so arranged that it does not interfere with threading of the tape from the tape roll to the apron roll or dispensing of the tape and apron.

Another object of this invention is to provide a tape and apron dispensing apparatus having a roll brake and cut-off device which is of simple and economical construction.

These, together with other objects and advantages of this invention will be more readily understood by reference to the following detailed description, when taken in connection with the accompanying drawings wherein.

Figure 1:
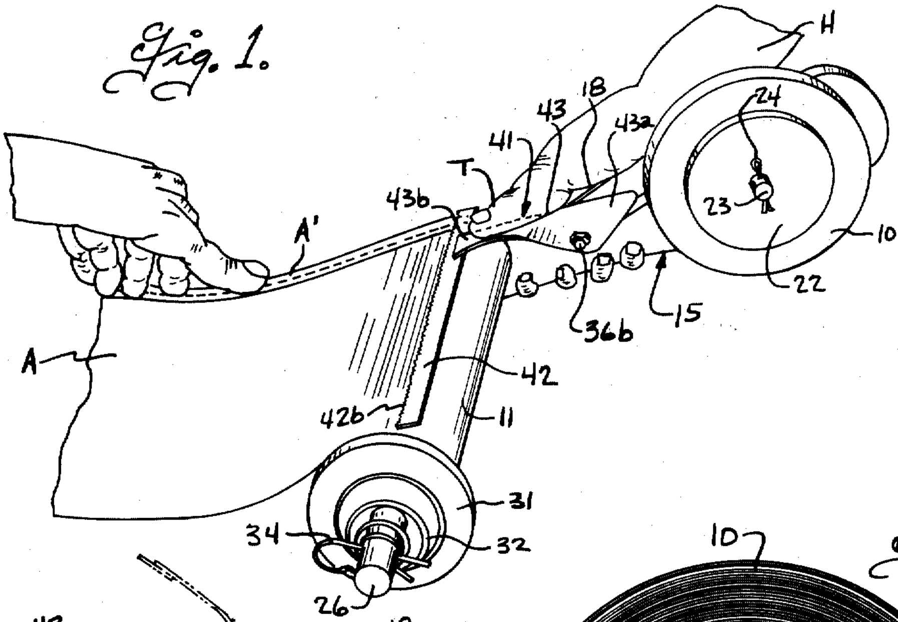
FIG. 1 is a perspective view illustrating the apparatus in use in applying a taped apron to a surface to be masked.

The tape and apron dispensing apparatus of the present invention is of the type disclosed in my U.S. Pat. No. 3,787,271 to which reference is made for a more complete description. In general, the tape and apron dispensing apparatus is arranged to apply a pressure sensitive tape from a roll 10 of pressure sensitive tape to an edge portion of a roll 11 of apron material to form a taped apron A with the strip of pressure sensitive tape A' adhered to and extending beyond the edge of the apron for attachment to the surface to be masked. The pressure sensitive tape 10 is of the type commonly used for masking and, as shown, the tape is wound on a tubular core **10*b*. The roll 11 of apron material is preferably similarly wound on a tubular core 11*b*.**

The tape and apron dispensing apparatus is constructed and arranged so that it can be manipulated with one hand to dispense and guide the taped apron while the taped apron is being applied to the surface to be masked. The tape and apron dispensing apparatus includes an elongated body member 15 in the form of a generally flat panel having opposed relatively wide inner and outer sides 16 and 17 and upper and lower edges 18 and 19.

Figure 3:
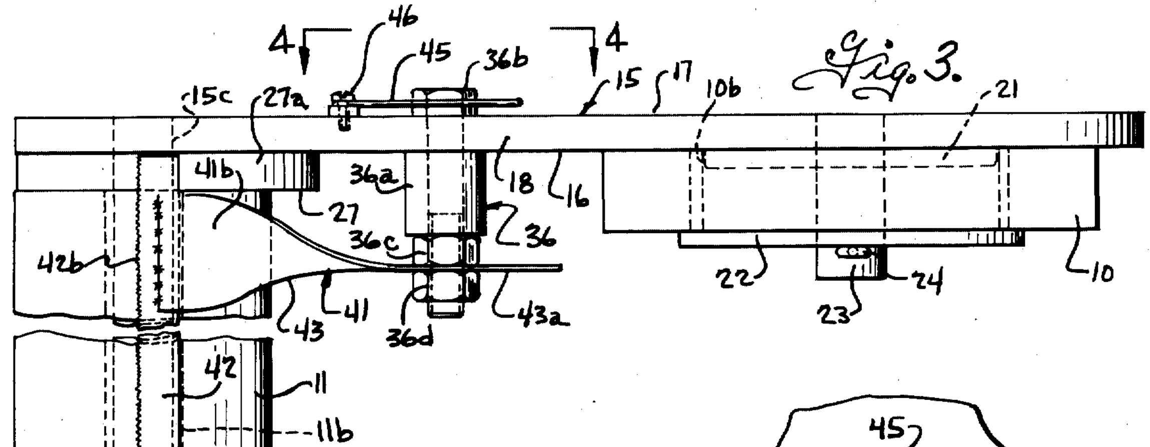
FIG. 3 is a plan view of the portable tape and apron dispensing apparatus.

The roll of pressure sensitive tape 10 is supported adjacent the rear end of the body member for rotation about an axis perpendicular to the inner face 16 and, as best shown in FIG. 3, the body member 15 has a circular boss 21 on its inner face 16 which extends into the tubular core **10*b* of the roll of pressure sensitive tape to rotatably support the same. The roll of pressure sensitive tape is axially retained in position on the body member by a disk 22 that engages the outer end of the tape roll. The disk is mounted on the body member by a stub shaft 23 and a releasable fastener such as a cotter pin 24 to maintain one end face of the roll of tape in close adjacency to the inner side face 16** of the body member.

The roll of apron material 11 is rotatably supported on a shaft 26 which is attached to the body member 15 adjacent its forward end and which extends from the inner side face 16 in cantilever fashion. The shaft 26 can be formed of a rod or tube having one end rigidly anchored in the body member as by extending into an opening **15*c*. An apron guide face 27 is formed on the body member to engage the inner end of the apron roll and to space the same laterally from the inner face 16 of the body member a distance less than the width of the tape and preferably about half the tape width. The apron guide face is arranged to extend to the outer periphery of the apron roll, but the upper edge 27*a* of the apron guide face is offset below the upper edge 18 of the body member to lie below the tape strip as it passes from the tape roll over the apron roll and from the apron roll to the point of application of the apron strip to the surface to be masked. In order to inhibit loosening of the apron material on the roll 11, a pressure applying disk 31 is provided at the outer end of the apron roll with an outer diameter at least as large as the apron roll, and the disk is yieldably pressed against the end of the apron roll as by a spring means 32 retained on the shaft as by a fastener such as a snap pin 34.** Other arrangements for applying a light, yieldable pressure against the end of the apron roll to axially confine the apron roll and inhibit unloosening of the apron material can be utilized, if desired.

A tape guide 36 is mounted on the inner face of the body member to engage the tape strip as it passes from the tape roll over the apron roll to maintain at least a partial wrap of the tape strip around the apron roll during dispensing of the taped apron. The tape guide 36 is located at a level substantially below a line tangent to the tops of the apron and tape rolls and, as shown, is disposed along a line adjacent the plane through the axes of the tape and apron rolls.

The mounts for the tape and apron rolls on the body member are arranged so that the peripheries of the tape and apron rolls are spaced apart a distance sufficient to receive a hand therebetween, and the portion of the body member intermediate the tape and apron rolls is shaped to provide a handgrip for one hand support and manipulation of the tape and apron dispensing apparatus. The intermediate portion of the body member provides a handgrip which extends lengthwise of the body member and hence generally parallel to the direction in which the taped apron is withdrawn from the apparatus, so that the apparatus can be comfortably supported and manipulated by one hand shown at H in FIG. 1, with the thumb portion proximal the hand overlying the upper edge and the fingers of the hand grasping the lower edge, as shown in FIG. 1. Finger-receiving notches 19*a* are conveniently provided in the lower edge 19 of the body member to facilitate holding of the body member. The intermediate handgrip portion of the body member is preferably made relatively wide and such that the upper and lower edges 18 and 19 of the intermediate handgrip portion of the body member are spaced respectively above and below the path of travel of the tape portion 10*a* as it passes from the tape roll 10 over the apron roll so as to avoid interference between the tape and a hand on the handgrip portion.

Figure 4:
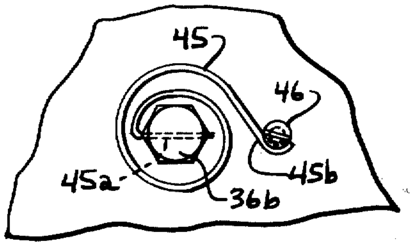
FIG. 4 is a fragmentary view taken on the plane 4—4 of FIG. 3.

A roll brake and cut-off device 41 is provided on the tape and apron dispenser to facilitate tearing dispensed end sections of the taped apron from the remainder of the rolls. The roll brake and cut-off device includes a cutter bar 42 adapted to extend lengthwise of the apron roll from the inner side 16 of the body member to the outer end of the apron roll and having a preferably serrated cutting edge 42*b*. The cutter bar is supported on an arm 43 for movement in a direction laterally of the apron roll between an operative position shown in solid lines in FIG. 2 and a raised position as shown in phantom in FIG. 2. The arm is rigidly attached at one end to the cutter bar as by welding and the other end of the arm is mounted on the body member for pivotal movement relative thereto at a location such as to not interfere with the threading of the top from roll 10 under guide 36 and over the apron roll 11. For this purpose, the arm is pivotally mounted on the inner side of the body member at a location above the tape as it passes from the tape roll and under guide 36 to the apron roll and the pivoted end of the arm 43 is also laterally offset from the inner side 11 of the body member a distance greater than the width of the tape. The arm 43 is pivotally mounted at the inner end of the tape guide member 36 and, in the embodiment shown, the tape guide member is in the form of a tubular boss 36*a* on the inner side of the body member. The arm 43 is formed with one end portion 43*a* disposed in a plane generally paralleling the inner side of the body member and the end 43*a* is pivotally mounted at the inner end of the boss 36*a* by a bolt 36*b* and nuts 36*c* and 36*d*. The bolt is rotatably received in the tubular boss 36*a* and the arm is non-rotatably clamped to the bolt 36*b* by the nuts 36*c* and 36*d*. Provision is advantageously made for yieldably biasing the arm 43 in a direction to maintain the cutter bar in engagement with the apron roll 11, to inhibit unwinding of the apron roll after the end piece is severed. As shown in FIG. 4, a torsion coil spring 45 is provided and has one end 45*a* extending into a transverse opening in the head of the bolt 36*b* and the other end 45*b* attached to the body member as by a screw 46.

Figure 2:
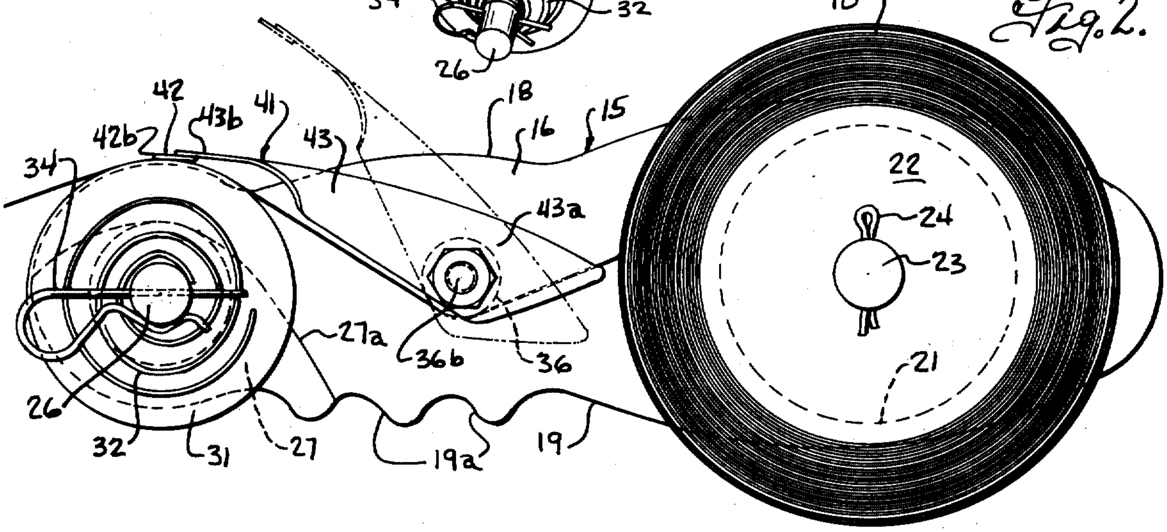
FIG. 2 is a side elevational view of the portable tape and apron dispensing apparatus.

The arm 43 is twisted through about 90° about its lengthwise axis and its other end portion 43*b* is disposed in a plane perpendicular to the inner surface of the body member. The upper face of the end portion 43*b* provides an upwardly facing surface on the arm 43 disposed alongside the inner side of the body member at a location where it can conveniently be engaged by the thumb T of the same hand H used to grasp the body member. Thus, the thumb T of the user's hand can be used to press on upper surface 43*b* of the arm 43 to thereby press the cutter bar 42 against the apron roll. This brakes or retards turning of the apron roll and facilitates tearing of the taped apron along the edge 42*b* of the cutter bar. The cutter bar and arm can be readily pivoted upwardly to a position as shown in phantom in FIG. 2, to facilitate grasping of the end of the apron with the user's other hand, to withdraw a further section of apron and tape. The arm 43 is advantageously formed so that the end portion 43*a* projects a substantial distance rearwardly of its pivot axis, as best shown in FIGS. 2 and 3. With this arrangement, the rearwardly projecting end portion 43*a* can be depressed, as by the thumb of the hand, to raise the forward portion of the arm and the cutter bar 42.

From the foregoing it is thought that the construction and operation of the tool will be readily understood. The tape roll is rotatably supported adjacent the rear end of the body member with one end at the plane of the inner face 16 and the apron roll is rotatably supported at the forward end of the body member with one end offset from the inner face 16 a distance less than the width of the tape so that the tape, as it passes from the tape roll over the apron roll, partially overlaps the edge of the apron roll to form a taped apron. The guide 36 guides the tape as it passes from the tape roll over the apron roll to assure a partial wrap of the tape around the apron roll and proper adherence of the tape to the apron. The roll of apron material is axially confined between the apron guide face 27 on the body member and disk 31 to not only maintain the apron roll in proper position against the guide face, but to also inhibit loosening of the apron material on the apron roll when the apparatus is not in use.

The handgrip for manipulating the tape and apron dispensing apparatus is formed by the intermediate portion of the body member and extends longitudinally of the body member parallel to the direction of withdrawal of the taped apron so that the apparatus can be comfortably held in one hand, and the handgrip portion is made relatively deep to prevent interference between the tape and the user's hand and to also provide leverage to counteract the weight of the cantilever supported apron roll. As shown in FIG. 1, the taped apron can be affixed to the surface as it is withdrawn from the apparatus and the apparatus can be accurately positioned and guided along the line to be masked while the operator's other hand is free to press the taped apron against the surface. When it is desired to tear off the dispensed end section of the taped apron, it is only necessary to apply pressure with the thumb T on the upwardly facing pressure applying surface on the arm portion 43*b* and then grasp the taped edge of the dispensed portion of the taped apron with the fingers of the other hand to move the taped apron in a tearing condition across the edge 42*b* of the cutter. Thus, it will be seen that the roll brake and cut-off device is mounted on the tape and apron dispenser in such a manner that it can be operated by the thumb of the same hand used to hold and manipulate the dispenser so that the user's other hand is free to manipulate and apply the taped apron to the surface to be masked.

The embodiments of the invention in which an exclusive property or privilege is claimed are defined as follows:

1. In a hand manipulable tape-apron dispensing apparatus for applying a strip of pressure sensitive tape to an edge of an apron strip and for dispensing the taped apron during application of the tape-apron to a surface to be masked, the dispensing apparatus including an elongated body member having inner and outer sides and upper and lower edges, tape roll support means on said body member adjacent one end for supporting a roll of pressure sensitive tape for rotation about an axis perpendicular to said inner side and with one end of the tape roll in a first plane adjacent said inner side of the body member, means extending laterally in cantilever fashion from said inner side of the body member adjacent the other end thereof for supporting a roll of apron material for rotation about a second axis parallel to the axis of the tape roll and with the periphery of the apron roll spaced a substantial distance from the periphery of the tape roll, apron roll guide means engaging one end of said apron roll for maintaining the same offset from said first plane a distance less than the width of the tape roll whereby a longitudinal portion of the tape strip from the tape roll will overlap and adhere to an edge portion of the apron strip on the apron roll when an end of the tape is withdrawn from its roll and passed over the apron roll at its upper side, said elongated body member having the portion thereof intermediate the tape roll and the apron roll adapted to be grasped in one hand to enable one hand positioning and movement of the dispensing apparatus during application of the taped apron to a surface being masked, the improvement comprising: a roll brake and cut-off device including a cutter bar adapted to extend lengthwise of the apron roll along the upper side thereof and an arm extending laterally of the cutter bar, means pivotally mounting one end of said arm on the body member at a location spaced from said other end of the body member to support the cutter bar for movement in a direction laterally of the upper side of the apron roll into and out of engagement therewith, said cut-off device having a portion providing an upwardly facing surface adjacent said body member at a location such that it can be engaged by the thumb of the same hand used to grasp the intermediate portion of the body member whereby the cutter bar can be selectively pressed by the thumb against the apron roll to facilitate tearing of taped apron along the cutter bar.

2. A hand manipulable tape-apron dispensing apparatus according to claim 1 wherein said arm is located at the inner side of said body member and said location of said pivotal mounting of said arm is intermediate said tape roll and said apron roll and below the upper edge of said body member.

3. A hand manipulable tape-apron dispensing apparatus according to claim 1 including a tape guide member extending laterally in cantilever fashion from the inner face of the body member at a location intermediate the tape roll and the apron roll and below upper peripheries of said rolls, said arm being pivotally mounted on the outer end of said tape guide member.

4. A hand manipulable tape-apron dispenser according to claim 3 wherein said arm comprises an elongated strap twisted through substantially 90° about its lengthwise axis with said one end portion disposed generally parallel to the inner face of the body member and the other end portion disposed generally parallel to the axis of said apron roll and providing said upwardly facing surface.

5. A hand manipulable tape-apron dispenser according to claim 1 wherein said arm comprises an elongated strap twisted through substantially 90° about its lengthwise axis with said one end portion disposed generally parallel to the inner face of the body member and the other end portion disposed generally parallel to the axis of said apron roll and providing said upwardly facing surface.

6. In a hand manipulable tape-apron dispensing apparatus for applying a strip of pressure sensitive tape to an edge of an apron strip and for dispensing the tape-apron during application of the tape-apron to a surface to be masked comprising, an elongated body member having inner and outer side faces and upper and lower edges, said body member having a shaft attached to a forward portion thereof and extending laterally from the inner side face of the panel in cantilever fashion for rotatably supporting a roll of apron material, an apron roll guide means engageable with the end of an apron roll to space the same from the inner side face of the panel, means adjacent the rear end of the panel for supporting a roll of pressure sensitive tape for rotation about an axis normal to said inner side face of the panel and with the end of the tape roll adjacent said inner side face, a tape guide extending laterally from said inner side face of said body member at a location intermediate said tape roll and said apron roll adapted to overlie the tape as it passes from the tape roll and over the apron roll, said elongated body member having an intermediate portion thereof spanning the space between said tape roll and said apron roll of a length to receive a hand therebetween, and the upper and lower edges of said intermediate portion of the body member being respectively spaced above and below the tape strip as it passes from tape roll under the tape guide and over the apron roll to provide a handgrip portion adapted to be grasped in one hand with the thumb portion of the hand overlying the upper edge and the fingers of the hand grasping the lower edge to enable one hand manipulation of the apparatus during application of the tape apron, the improvement comprising: a roll brake and cut-off device including an elongated arm at the inner side of the body member, means pivotally mounting one end of the arm on the inner side of the body member for movement about an axis perpendicular thereto and located intermediate the tape roll and said apron roll and above the tape strip as it passes from the tape roll under the tape guide and over the apron roll, said arm extending forwardly from said one end thereof, a cutter bar affixed to the other end of said arm and extending generally parallel to the pivot axis of the arm and lengthwise of the apron roll at the upper side thereof, said arm having a portion at the other end providing an upwardly facing surface adjacent the inner side of said body member adapted to be engaged by thumb of the same hand that is used to grasp the intermediate portion of the body member whereby the cutter bar can be selectively pressed by the user's thumb against the apron roll to facilitate tearing of the taped apron along the cutter bar.

7. A hand manipulable tape-apron dispensing apparatus according to claim 6 wherein said arm comprises an elongated strap twisted through substantially 90° about its lengthwise axis with said one end portion disposed generally parallel to and laterally offset from the inner face of the body member and the other end disposed generally parallel to the axis of said apron roll and providing said upwardly facing surface.

8. A hand manipulable tape-apron dispenser according to claim 6 wherein said one end of the arm is pivotally mounted on said tape guide.

9. A hand manipulable tape-apron dispenser according to claim 6 wherein said arm has a portion extending rearwardly from the pivot axis thereof and adapted to be manually depressed to raise said other end of the arm.

10. A hand manipulable tape-apron dispenser according to claim 6 including spring means yieldably biasing said arm about its pivot axis in a direction to resiliently press said cutter bar against the apron roll.

* * * * *